(12) United States Patent
Wiik et al.

(10) Patent No.: US 8,360,469 B2
(45) Date of Patent: Jan. 29, 2013

(54) AIRBAG SYSTEM

(75) Inventors: Richard Wiik, Fort Gratiot, MI (US); Jonathan R. Kibat, Warren, MI (US); Scott D. Thomas, Novi, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/870,720

(22) Filed: Aug. 27, 2010

(65) Prior Publication Data

US 2012/0049498 A1   Mar. 1, 2012

(51) Int. Cl.
*B60R 21/2338* (2011.01)
*B60R 21/20* (2011.01)
*B60R 21/207* (2006.01)
*B60R 21/26* (2011.01)
*B60R 21/16* (2006.01)

(52) U.S. Cl. ............................. 280/743.2; 280/730.2

(58) Field of Classification Search ............... 280/743.2, 280/730.2
See application file for complete search history.

(56) References Cited

U.S. PATENT DOCUMENTS

| | | | |
|---|---|---|---|
| 3,981,520 A | 9/1976 | Pulling | |
| 5,172,790 A | 12/1992 | Ishikawa et al. | |
| 6,010,149 A * | 1/2000 | Riedel et al. | 280/730.2 |
| 6,135,490 A * | 10/2000 | Spary | 280/730.2 |
| 6,390,502 B1 * | 5/2002 | Ryan et al. | 280/743.2 |
| 6,505,853 B2 * | 1/2003 | Brannon et al. | 280/730.2 |
| 6,634,671 B2 * | 10/2003 | Heigl et al. | 280/743.2 |
| 6,695,347 B2 * | 2/2004 | Sonnenberg et al. | 280/743.2 |
| 6,880,666 B2 * | 4/2005 | Kikuchi et al. | 180/274 |
| 6,966,576 B1 | 11/2005 | Greenstein | |
| 7,121,584 B2 * | 10/2006 | Hasebe et al. | 280/743.2 |
| 7,152,877 B2 * | 12/2006 | Hasebe et al. | 280/743.1 |
| 7,594,675 B2 | 9/2009 | Bostrom et al. | |
| 7,712,773 B2 * | 5/2010 | Walston | 280/730.2 |
| 7,766,374 B2 * | 8/2010 | Abele et al. | 280/730.1 |
| 7,946,621 B2 * | 5/2011 | Honda et al. | 280/743.2 |
| 8,047,564 B2 * | 11/2011 | Kibat et al. | 280/730.2 |
| 2005/0206138 A1 * | 9/2005 | Breuninger et al. | 280/729 |
| 2008/0061538 A1 | 3/2008 | Mohammad et al. | |
| 2008/0129024 A1 | 6/2008 | Suzuki et al. | |
| 2009/0001695 A1 | 1/2009 | Suzuki et al. | |
| 2010/0194083 A1 * | 8/2010 | Sugimoto et al. | 280/730.2 |
| 2010/0207363 A1 * | 8/2010 | Fredriksson et al. | 280/728.2 |
| 2011/0187087 A1 * | 8/2011 | Kibat | 280/730.2 |
| 2011/0278826 A1 | 11/2011 | Fukawatase et al. | |
| 2012/0038137 A1 * | 2/2012 | Wipasuramonton et al. | 280/733 |
| 2012/0091697 A1 * | 4/2012 | Wiik et al. | 280/730.2 |

FOREIGN PATENT DOCUMENTS

| | | |
|---|---|---|
| JP | 2010-052619 | 3/2010 |
| WO | WO-01/49535 A1 | 7/2001 |

* cited by examiner

*Primary Examiner* — Paul N Dickson
*Assistant Examiner* — Joselynn Y Sliteris
(74) *Attorney, Agent, or Firm* — Foley & Lardner LLP

(57) ABSTRACT

An occupant restraint apparatus for a motor vehicle that includes a cushion configured to inflate to provide restraint to an occupant of the vehicle, wherein the cushion includes an inflatable portion and at least one non-inflatable portion; an inflator configured to provide gas for inflating the inflatable portion of the cushion; and a tether having a first end connected to the cushion and a second anchored end. The cushion includes at least one opening in at least one of the non-inflatable portions and the tether passes through the opening.

26 Claims, 6 Drawing Sheets

AIRBAG SYSTEM

BACKGROUND

The present application relates generally to the field of airbags for use within motor vehicles. More specifically, this application relates to side-impact airbags that include a mechanism for providing tension to the airbag cushion during deployment to tailor the deployment trajectory of the cushion as well as providing restraint to the occupant upon contact between the cushion and the occupant.

SUMMARY

One embodiment of the invention relates to an occupant restraint apparatus for a motor vehicle that includes a cushion configured to inflate to provide restraint to an occupant of the vehicle, wherein the cushion includes an inflatable portion and at least one non-inflatable portion; an inflator configured to provide gas for inflating the inflatable portion of the cushion; and a tether having a first end connected to the cushion and a second anchored end. The cushion includes at least one opening in at least one of the non-inflatable portions and the tether passes through the opening.

The cushion may be configured to deploy from a seat assembly within the vehicle. The cushion may be folded and stored in a storage location prior to inflation, wherein the first end first end of the tether is connected to the cushion at a location proximate to an edge of the cushion that is forward of the anchored end of the tether. The second anchored end of the tether may be anchored to the cushion at a location proximate to an edge of the cushion that trails the rest of the cushion out of the storage location during deployment of the cushion. The tether is shorter than the distance between the locations on the cushion adjacent to the connected and anchored ends of the tether to tailor the deployment trajectory of the cushion and to provide occupant restraint.

Another embodiment of the invention relates to an occupant restraint apparatus that includes a cushion having an inflatable portion and at least one non-inflatable portion that is configured to inflate to provide restraint to an occupant of the vehicle; an inflator configured to provide gas for inflating the inflatable portion of the cushion; and a tether having a first end connected to the cushion and a second anchored end. The cushion includes a first opening and a second opening in at least one of the non-inflatable portions and the tether passes through the openings so that the portion of the tether between the first and second openings is located on a different side of the cushion than the portion of the tether located between the first opening and the other end of the tether.

Another embodiment of the invention relates to an occupant restraint apparatus, for a vehicle, that includes an inflatable cushion having a non-inflatable portion that is configured for storage in the folded configuration, an inflator configured to provide gas to inflate the cushion, and a tether for controlling the deployed positioning of the cushion. The cushion is configured to inflate from a fixed position into a position to provide restraint to an occupant of the vehicle. The tether may be coupled to the cushion at the first coupling location and to the non-inflatable portion at the third coupling location. The third coupling location may be located on the tether between the first and second coupling locations, and the distance along the tether from the first coupling location to the second coupling location is less than the distance along the cushion from the first coupling location to a portion of the cushion adjacent to the second coupling location of the tether.

The occupant restraint apparatus may further include a flap or a sleeve to couple the second coupling location of the tether. The occupant restraint apparatus may further include a fourth coupling location, which may be coupled to the non-inflatable portion and may be located on the tether between the second and third coupling locations.

DETAILED DESCRIPTION

Figure 1:
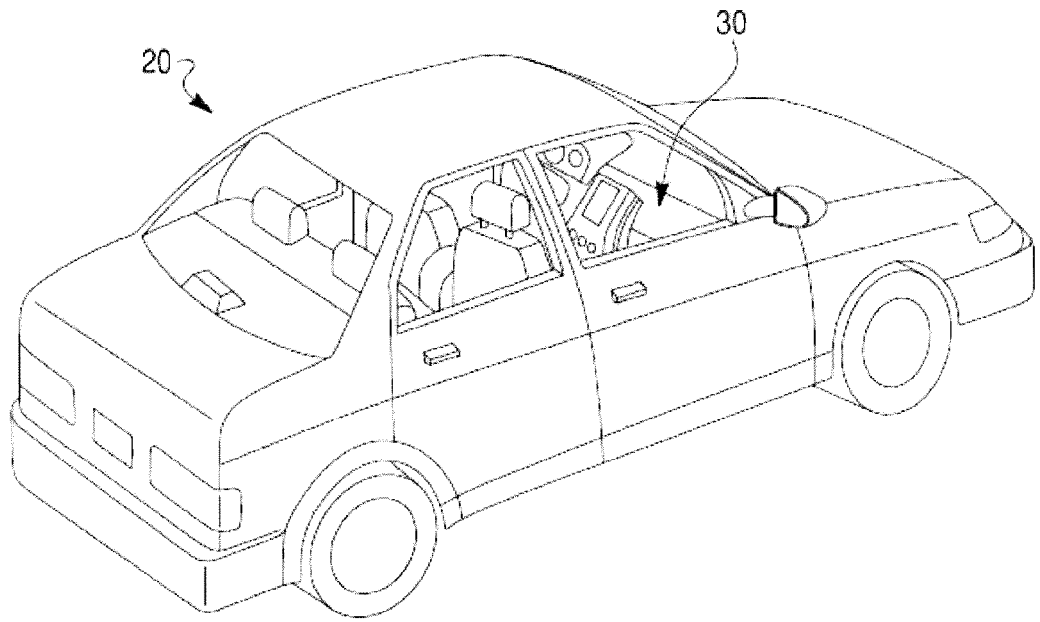
FIG. 1 is a perspective view of a motor vehicle, which includes an occupant restraint system.

Side-impact airbag systems are located in vehicles to help reduce occupant injury potential during a dynamic vehicle event, such as a side-impact or rollover event. A side-impact airbag system may include an inflatable airbag cushion that deploys during a dynamic vehicle event and inflates from gas which is rapidly pushed into the airbag cushion by means of an inflator. An inflator or module may use a device, such as a pyrotechnic device or other airbag inflation device, to generate gas almost instantaneously and to push the gas at a high volumetric flow rate into the inflatable airbag cushion of the airbag system. A side-impact airbag cushion or airbag may be stored within and deployed from a seat assembly of a vehicle, typically either the inside or outside facing surfaces of the seat-back. Side-impact airbags are typically packaged through a process of folding and rolling to compact the airbag in order for it to fit into the small cross-section of the storage area, such as the seat-back of a seat assembly. After installation, the airbag may be stored within the seat-back to provide improved interior vehicle appearance. Side-impact airbags may be used to provide restraint to occupants located in any seating row (e.g., first, second, third) of a vehicle and typically provide restraint to outboard occupants when deployed. A single side-impact airbag may be configured with multiple inflatable airbag portions or chambers to provide restraint to one or more than one occupant, which may be located in different seating rows and/or positions.

A side-impact airbag system, as disclosed herein, may include a tether or tensioning strap. A tether may be configured to have two or more ends, where each end may couple to a portion of the airbag assembly or another vehicle component (e.g., seat assembly), to influence the trajectory of the airbag cushion during deployment and/or to influence the final position (i.e., the position of the airbag when deployment is complete). The tether may influence the deployment trajectory of the airbag cushion by imparting forces into the airbag cushion at the fixing (or coupling) positions between the tether and the airbag assembly. These forces are induced by the tension created in the tether due to expansion of the airbag cushion and can produce effects, such as curving or dimpling of the airbag cushion. The tension in the tether is created by configuring the distance along the tether between the coupling locations, which may couple the tether to the airbag cushion, to be shorter relative to the distance along the airbag cushion between the same coupling locations. During deployment, as the airbag cushion expands due to increasing internal airbag chamber pressure from an increasing volume of inflation gas being generated by the inflator, the tension in the tether increases.

A side-impact airbag system may be configured to tailor the deployment trajectory of the airbag cushion to improve safety. For example, conventional side-impact airbags (i.e., without tailored deployment trajectories) may contact other vehicle components, such as a seat armrest, or aesthetic trim components, while expanding during deployment. Contacting another such component during deployment can impede the deployment or alter the trajectory of the airbag and result in the airbag having reduced effectiveness in providing occupant restraint. Thus the side-impact airbag system disclosed herein allows for the airbag deployment trajectory to be tailored to the specific vehicle configuration, so that during deployment the airbag cushion will expand in a way to avoid other components that could impede or alter the trajectory of the deploying cushion.

A side-impact airbag system, as disclosed herein, utilizing a tether to tailor deployment also allows for an inexpensive and efficient way to carry-over a common airbag cushion and inflator across varying product lines. For example, a vehicle platform will produce multiple vehicles having varying internal configurations to meet broad customer expectations, which leads to some models having different components that could impede airbag deployment at different locations in the vehicle relative to a baseline vehicle. A side-impact airbag system may include a common airbag cushion and inflator, and by having an alternative configuration of the tether or by adding more than one tether, the deployment trajectory and/or final position of the airbag cushion may be tailored to provide improved occupant restraint for each specific model across multiple vehicle platforms, each having varying configurations.

Furthermore, a side-impact airbag system may include a tether to tailor deployment, so that the final (i.e., completed deployment) position of the cushion is at a specific position with a specific configuration. For example, a side-impact airbag system may be deployed from the side of a seat-back of a seat assembly and may include a tether to tailor its final position relative to the occupant of the seat. An airbag module configured as such, when deployed, induces a forward and away from the seat or seat occupant (in the cross-car direction) expansion of the airbag cushion due to the forces entering the airbag cushion having a lateral vector component caused by the position of the inflator within the seat-back.

A tether may be coupled to the airbag cushion to influence its trajectory, during deployment, by counteracting these lateral inflation forces that induce the airbag to expand and/or move away from the seat in the cross-car direction, causing the airbag cushion to expand and/or move toward the seat and forward after initial deployment. Occupant restraint is improved during a dynamic vehicle event because the tether influences the airbag cushion to deploy toward the seat occupant and thereby reduces the displacement the occupant undergoes during the event. In addition to influencing deployment trajectory, the tether may also form a structural member of the airbag system to improve the structural rigidity of the system to further reduce the displacement of the occupant by aiding in the control of occupant loading. This reduction of displacement reduces the energy of the occupant and thus may reduce the reaction forces imparted from the airbag cushion to the occupant from contact between the two.

Additionally, a side-impact airbag system, as disclosed herein, utilizes the tether to provide improved occupant restraint by reducing displacement of the occupant during an airbag deployment triggering event. Occupant displacement is decreased by reducing the displacement of the airbag cushion after contact between the occupant and the cushion. During the dynamic event, the occupant has momentum and may accelerate toward the airbag cushion, where upon contact with the cushion, the occupant imparts a force into the cushion. The cushion reacts to at least a portion of this force, but the conventional configuration of the side-impact airbag when deployed from the seat-back acts like a cantilever beam, since the trailing (or rearward) edge of the cushion typically is coupled to the seat and the leading (or forward) edge of the cushion is not coupled to the seat or any other substantially fixed member of the vehicle. Hence, the conventional airbag cushion reacts to at least a portion of the occupant force, but the cushion may displace in a lateral direction from the force of the occupant, which allows the occupant to displace as well. As disclosed herein, the tether may be configured to provide improved occupant restraint, by stiffening the cushion to better manage occupant loading and limiting the displacement of the cushion under loading from the occupant, thus reducing the displacement of the occupant.

With reference to FIG. 1, an exemplary embodiment of a motor vehicle 20 is illustrated and includes a passenger compartment 30. The passenger compartment includes at least one occupant restraint system or side-impact airbag system. The occupant restraint systems disclosed herein can be included within any passenger compartment (e.g., driver-side, passenger-side, rear passenger) and are not limited by the illustrations herein. An occupant restraint as disclosed herein may be configured to protect any occupant of any vehicle.

Figure 2:
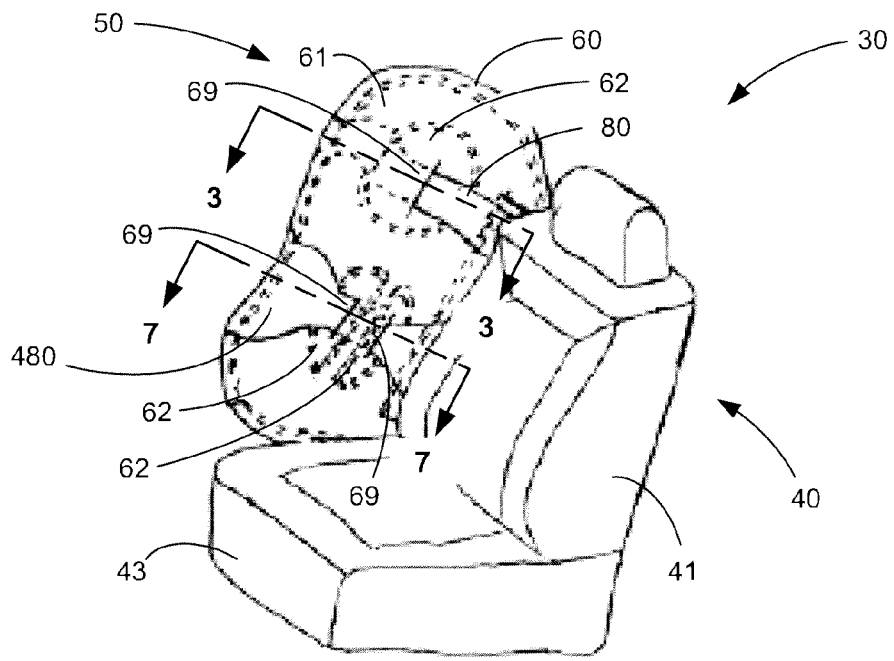
FIG. 2 is a perspective view of an exemplary embodiment of an occupant restraint system illustrated deployed or unfolded from the side of a seat assembly.

With reference to FIG. 2, a passenger compartment 30 is illustrated and includes a seat assembly 40. According to an exemplary embodiment, seat assembly 40 includes a seat-back 41, a seat-cushion 43 and an occupant restraint system (or airbag system) 50. The airbag system 50 may be stored in and deployed from the seat-back 41, the seat-cushion 43, or from anywhere on the seat assembly 40. According to other embodiments, the airbag system may be stored in and deployed from other vehicle components.

Airbag system 50 is shown deployed in FIG. 2 to include an airbag cushion 60, a first tether (or tension mechanism) 80 and a second tether 480. An airbag system 50 may be configured to include one tether or any number of tethers. The position of each tether relative to the airbag cushion and to other tethers can be varied to tailor the deployment trajectory of the cushion to meet varying vehicle configurations. Although airbag system 50 is illustrated to deploy from seat assembly 40, a conventional bucket style seat configured to provide seating for one occupant, the airbag systems disclosed herein may be included within or configured to deploy from any seat assembly (e.g., multiple occupant bench, fold and tumble, etc.)

Figure 3:
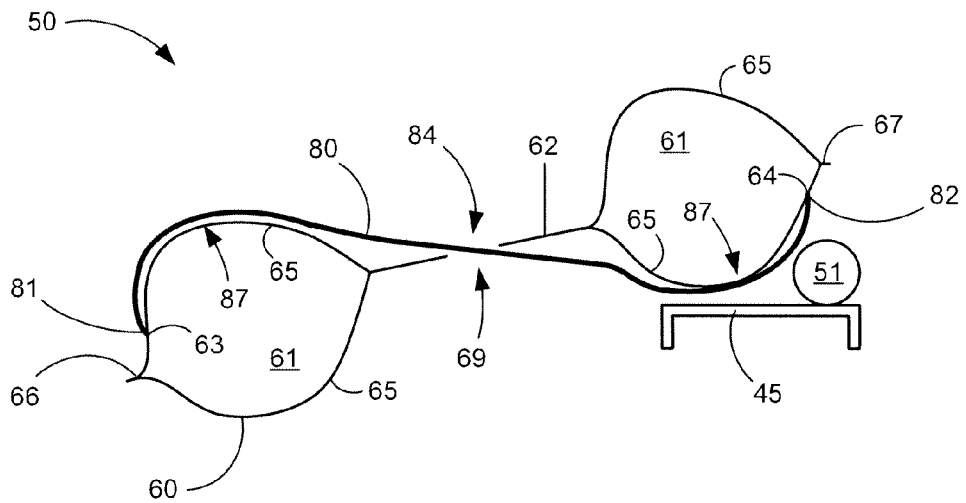
FIG. 3 is a cross-sectional top view, taken along line 3-3 in FIG. 2, illustrating an exemplary embodiment of an occupant restraint system.

With reference to FIG. 3, an exemplary embodiment of an airbag system 50 is shown deployed or unfolded, and includes an inflatable airbag cushion 60, an inflator 51, and a tether 80. Airbag system 50 may be coupled to a structural member 45 of the seat-back 41 of seat assembly 40 using conventional methods.

The airbag cushion 60 may be made from one or a plurality of high strength fabric panels configured to form an inflatable portion 61. The fabric panels of the airbag cushion may be coated to prevent inflation gas from escaping during deployment or may remain uncoated. The airbag cushion may be configured to form a plurality of inflatable portions or may include multiple independent inflatable chambers. The airbag cushion 60 may further include one or a plurality of non-inflatable portions 62 within or adjacent to the inflatable portion 61. According to the exemplary embodiment shown in FIG. 2, airbag cushion 60 includes one inflatable portion 61 and includes three non-inflatable portions 62. The non-inflatable portion 62 may improve tailoring of the deployment trajectory of the cushion by having a lower area moment of inertia (i.e., resistance to bending) relative to the inflatable portion 61. The airbag cushion 60 may further include one or a plurality of openings 69. The opening 69 may be configured within a non-inflatable portion 62, such as shown in FIG. 2. The opening may be configured anywhere on the cushion, such as within an inflatable portion where the opening may also have a seam to prevent inflation gas from escaping. The size of the opening 69 may vary and is configured to permit the tether to pass through. Thus, an airbag cushion 60 may have a plurality of openings 69, where each opening 69 may have a unique size to accommodate a corresponding tether from the plurality of tethers 80, 480, since each tether may have a unique size and shape.

Figure 4:
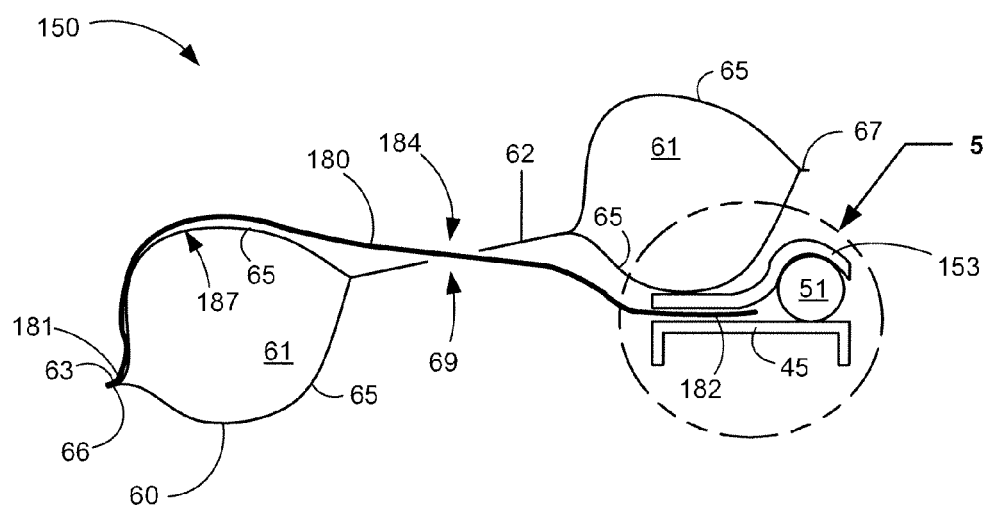
FIG. 4 is a cross-sectional top view of another exemplary embodiment of an occupant restraint system.

The cross-sectional shape of the airbag cushion as well as the shape of the inflatable and non-inflatable portions may vary (e.g., across the length, width, and/or depth of the cushion). During deployment, the inflatable portion 61 may include two opposing curved or concave surfaces 65, which may be symmetric. According to an exemplary embodiment, the airbag cushion 60 may include an inflatable portion 61 with a non-inflatable portion 62 within the inflatable portion 61. The cross section of this embodiment is shown in FIGS. 3 and 4 to include the inflatable portion 61 having two regions separated by the non-inflatable portion 62. The non-inflatable portion 62 is illustrated to include the opening 69 to permit the tether to pass through, so that one end of the tether may be coupled on one side of the cushion and the other end of the tether may be coupled on the other side of the cushion.

According to an exemplary embodiment, the tether 80 may be configured as a tension strap having a substantially uniform cross-section along the length of the tether 80. The tether 80 may include a first coupling location 81 on a first end and a second coupling location 82 on a second end. The first coupling location 81 of the tether 80 may be configured to couple to a first coupling location 63 of the airbag cushion 60 using any suitable method (e.g., stitching, adhesive) that withstands the desired tension (e.g., tension induced during deployment and from loading by the occupant). According to an exemplary embodiment, the first coupling location 63 of the cushion 60 may be located on the outboard (i.e., non-seat) side of the region of the inflatable portion 61 having the leading edge of deployment 66 (i.e., the edge of the cushion that leads the rest of the airbag cushion out of the storage location during deployment of the cushion). According to other exemplary embodiments, the first coupling location 63 may be located on a selvedge portion, on a non-inflatable portion of the cushion, or on any suitable location of the cushion.

The second coupling location 82 of the tether 80 may be configured to couple to a second coupling location 64 of the airbag cushion 60 using any method. The second coupling location 64 of the cushion 60 may be located on the inboard (i.e., seat) side of the region of the inflatable portion 61 having the trailing edge of deployment 67 (i.e., the edge of the cushion that trails the rest of the airbag cushion out of the storage location during deployment of the cushion).

The tether 80 may further include a first portion 84 located between the first and second coupling locations 81, 82. The first portion 84 of the tether 80 may pass through the opening 69 of airbag cushion 60. Thus, the tether 80 may have a first end with a first coupling location 81 coupled to the outboard side of the cushion near the leading edge of deployment 66 at the first coupling location 63 of the cushion 60, may have a second end with a second coupling location 82 coupled to the inboard side of the cushion near the trailing edge of deployment 67 at the second coupling location 64 of the cushion 60, and may have a portion 84 between the first and second ends that passes through the opening 69 of the airbag cushion 60.

The couple between the first coupling location of the tether and the first coupling location of the cushion can be positioned and/or formed in varying manners. The couple between the second coupling location of the tether and the second coupling location of the cushion may be positioned and/or formed in a similar manner as the first coupling, or in a different manner. The first and second coupling locations of the tether may be located on first and second coupling locations of the cushion in varying locations and may be formed in varying manners. For example, the coupling locations may be located at a selvedge location outside the inflated region of the cushion, at a joint where a plurality of cushion portions couple to form the structural attachment at the perimeter of the inflated region of the cushion, at an inflated region of the cushion, at a non-inflated region of the cushion, or at any portion of the cushion. It should be noted that the embodiments described in the present application should not be considered as limitations to the method of coupling the tether to the airbag system or to the seat assembly and any suitable method may be utilized.

According to another exemplary embodiment, the airbag system 150 may further include a member (or bracket) 153 for coupling to the structural member 45 of the seat assembly 40, as shown in FIG. 4. The member 153 may be coupled to the structural member 45 using any coupling method (e.g., conventional fastener, welding, etc). The member 153 may be configured for coupling the inflator 51 and the second coupling location 182 of the tether 180. According to an exemplary embodiment, the second coupling location 182 of the tether 180 may be positioned between the member 153 and the structural member 45 of seat assembly 40, whereby the tether 180 may be retained at the second coupling location 182 by a clamp load created between member 153 and structural member 45. According to other exemplary embodiments, the second coupling location 182 may be retained by a stud coupling the second coupling location 182 to the member 153, or may be positioned on or near a sleeve that at least partially surrounds a portion of the member 153 and is retained by a stud connecting the coupling member 153 to seat structural member 45.

The airbag cushion 60 may be positioned adjacent to or coupled to member 153, so that during deployment, the inboard side of the rearward region of the inflatable portion 61 (i.e., the region of the inflatable portion 61 that includes the trailing edge of deployment 67) remains proximate to the member 153 and hence the second coupling location 182 of tether 180. Thus, the tether 180 may have a first end with a first coupling location 181 coupled to the selvedge portion of the cushion along the outboard side of the cushion near the leading edge of deployment 66 at the first coupling location 63 of the cushion 60, may have a second end with a second coupling location 182 coupled to the member 153 (or via an approximate attachment) adjacent to the inboard side of the cushion, and may have a portion 184 between the first and second ends that passes through the opening 69 of the airbag cushion 60. The second coupling location 182 of the tether 180 may be also be coupled using any suitable method (e.g., stitching, adhesive, combination of both, etc.) to the sleeve, the cushion, such as to the cushion material adjacent to the sleeve.

According to another exemplary embodiment, the member 853 of airbag system 850 may include a coupling feature (e.g., formed tab, formed portion, aperture) for coupling the second coupling location 882 of the tether 880. For example, as shown in FIG. 5B, the member 853 may have the tab 854 formed in the substantially downward direction (i.e., towards the tether 880 and structural member 845), wherein structural member 245 may have an aperture for receiving the tab 854. The second coupling location 882 of the tether 880 may include an aperture for receiving the tab 854 of the member 845. The tab 854, the clamp load created by the member 853 and structural member 845, or the combination of both may retain the tether 880 when subjected to tension, such as during airbag deployment.

The tether 880 may include a reinforcing feature or member to improve the strength of the second coupling location 882. For example, the end of tether 880 may be folded over onto an adjacent portion of the tether 880 and may be coupled together through conventional methods (e.g., stitching, adhesive, etc.), or may include a rod made from a polymer or alloy that may be inserted in the sleeve formed by the folded portion of the tether. A fastener may be used to further improve the mechanical coupling of the second coupling location 182 of the tether. Thus, the structural integrity of the joint or coupling may be improved to withstand higher tension.

Figure 5A:
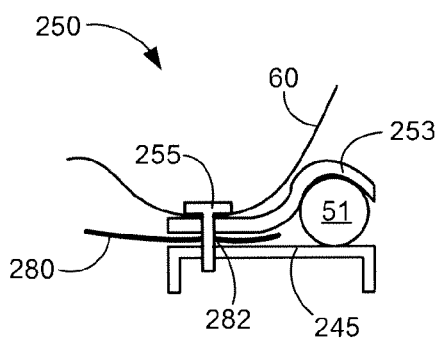
FIG. 5A is a detail view illustrating another exemplary embodiment of an occupant restraint system.
Figure 5B:
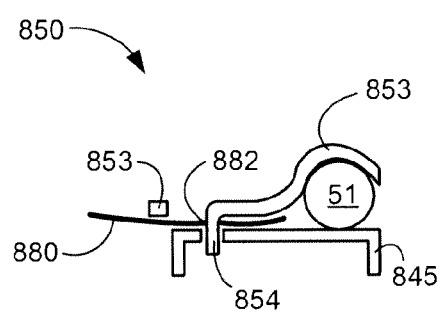
FIG. 5B is a detail view illustrating another exemplary embodiment of an occupant restraint system.

According to another exemplary embodiment, the airbag system 250 may further include a fastening mechanism 255, such as shown in FIG. 5A. The fastening mechanism 255 may include a bolt, a stud, a screw, a rivet, or any conventional method for coupling or fastening a plurality of members together. The member 253 of airbag system 250 retains the inflator 51 and includes an aperture for receiving the fastening mechanism 255. The second coupling location 282 of the tether 280 includes an aperture for receiving the fastening mechanism 255. The fastening mechanism 255, the clamp load created between the coupling of the member 253 and structural member 245, or the combination of both may retain the tether 280 when subjected to tension, such as during airbag deployment. The fastening mechanism 255 may also be configured to retain the airbag cushion 60 of the airbag system 250 at a fixing position, so that during deployment, the inboard side of the rearward region of the inflatable portion 61 (i.e., the region of the inflatable portion 61 that includes the trailing edge of deployment) remains proximate to the member 253 and hence the second coupling location 282 of tether 280.

Thus, the tether 280 may have a first end with a first coupling location 281 coupled to the outboard side of the cushion near the leading edge of deployment 66 at the first coupling location 63 of the cushion 60, may have a second end with a second coupling location 282 coupled to the fastening mechanism 255 (which is adjacent to the inboard side of the cushion), and may have a portion 284 between the first and second ends that passes through the opening 69 of the airbag cushion 60. The structural integrity of the first coupling location may further be improved by a reinforcing feature or member, as described herein.

Figure 5C:
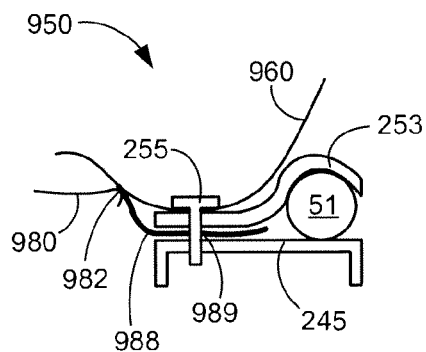
FIG. 5C is a detail view illustrating another exemplary embodiment of an occupant restraint system.

According to another exemplary embodiment, the airbag system 950 may further include a flap 988, such as shown in FIG. 5C. The fastening mechanism 255 is configured to retain the airbag cushion 960, the member 253 (which retains inflator 51), and the flap 988 by clamp load between the structural member 245 and fastening mechanism 255. The flap 988 may be made from a flexible material, such as a woven fabric. The flap 988 includes a coupling feature 989 in order for the flap 988 to be retained. According to an exemplary embodiment, the coupling feature 989 is an aperture configured to receive the fastening mechanism 255. According to other exemplary embodiments, the coupling feature 989 may be any suitable method for coupling the flap 988. The tether 980 includes a first coupling location that may be configured as discussed herein and a second coupling location 982. The second coupling location 982 is coupled to the flap 988 using any suitable method, such as stitching. The tether 980 may further be coupled to the cushion 960 at the second coupling location 982, such that the flap 988, the cushion 960 and the tether 980 are coupled together. It should be noted that the flap 988 may be included in any other embodiment, and should not be construed as limited to the airbag system 950 shown in FIG. 5C.

Figure 5D:
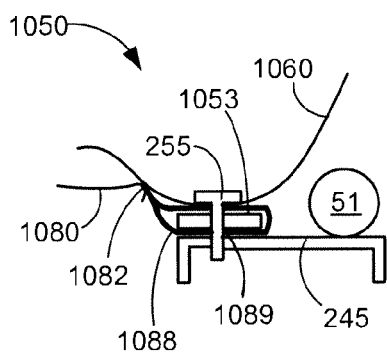
FIG. 5D is a detail view illustrating another exemplary embodiment of an occupant restraint system.

According to another exemplary embodiment, the airbag system 1050 may include a sleeve 1088, such as shown in FIG. 5D. The fastening mechanism 255 is configured to retain the airbag cushion 1060, the member 1053 (which may retain inflator 51), and the sleeve 1088 by clamp load between the structural member 245 and fastening mechanism 255. The sleeve 1088 may be made from a flexible material, such as a woven fabric. The sleeve 1088 may route around the member 1053 to form a loop section. The sleeve 1088 includes at least one aperture 1089 in order for the sleeve 1088 to be retained by the fastening mechanism 255. The tether 1080 includes a first coupling location that may be configured as discussed herein and a second coupling location 1082. The end of the sleeve 1088 is coupled to the second coupling location 1082 of tether 1080 using any suitable method. The end of the sleeve 1088 and/or the second coupling location 1082 may further be coupled to the airbag cushion 1060 using any suitable method. The sleeve 1088 (as well as the flap 988 shown in FIG. 5C) help maintain the inboard rearward portion of the cushion in a position proximate to the member and/or the structural member. It should be noted that the sleeve 1088 may be included in any other embodiment, and should not be construed as limited to the airbag system 1050 shown in FIG. 5D.

Figure 6:
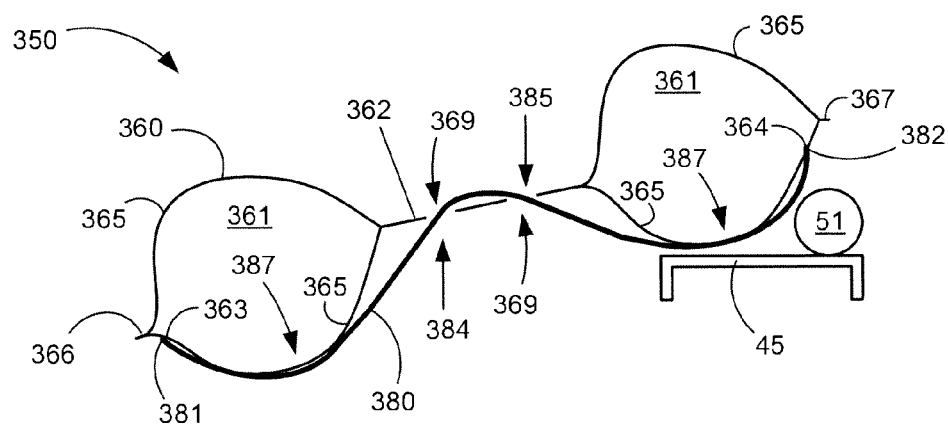
FIG. 6 is a cross-sectional top view of another exemplary embodiment of an occupant restraint system.

With reference to FIG. 6, an exemplary embodiment of an airbag system 350 is shown deployed or unfolded, and includes an inflatable airbag cushion 360, an inflator 51, and a tether 380. Airbag system 350 may be coupled to a structural member 45 of seat assembly 40 using conventional methods.

The airbag cushion 360 may form an inflatable portion 361 and may include a non-inflatable portion 362 adjacent to or surrounded by the inflatable portion 361. Thus, the cross-section of cushion 360 may be configured to have two regions of the inflatable portion 361 separated by the non-inflatable portion 362. The airbag cushion 360 includes a leading edge of deployment 366 configured to unfold or expand away from the trailing edge of deployment 367 when the airbag system 350 is triggered to deploy. During deployment, the inflatable portions 361 may include two opposing curved or concave surfaces 365. The airbag cushion 360 may further include a plurality of openings 369, which, for example, may be included in the non-inflatable portion 362.

According to an exemplary embodiment, the tether 380 may include a first coupling location 381, a second coupling location 382, a first portion 384, and a second portion 385. The first coupling location 381 may couple to the first coupling location 363 of the cushion 360, which may be on the inboard side of the cushion. The second coupling location 382 may couple to the second coupling location 364 of the cushion 360, which may be on the inboard side of the cushion. The first and second portions 384, 385 of the tether 380 may pass through the openings 369 in cushion 360, so the length of tether 380 between the second coupling location 382 and the second portion 385 may be on the inboard side of the cushion 360, the length of tether 380 between the first coupling location 381 and the first portion 384 may be on the inboard side of the cushion 360, and the length of tether 380 between the first and second portions 384, 385 may be on the outboard side of the cushion 360.

Figure 7:
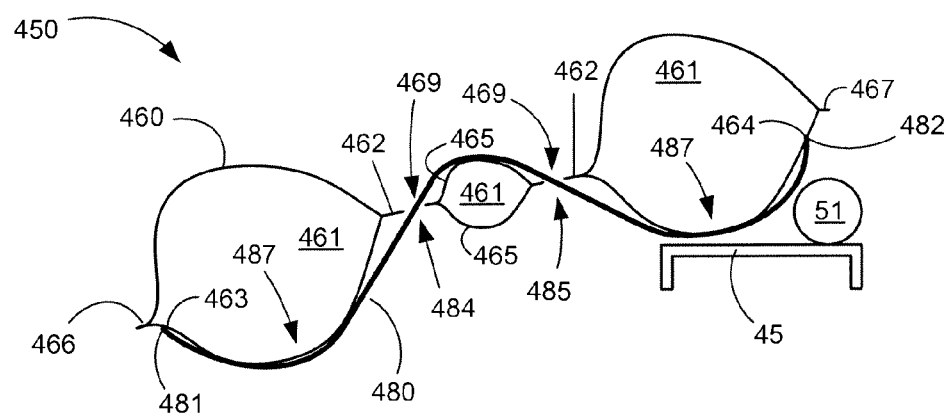
FIG. 7 is a cross-sectional top view, taken along line 7-7 in FIG. 2, illustrating another exemplary embodiment of an occupant restraint system.

With reference to FIG. 7, an exemplary embodiment of an airbag system 450 is shown deployed or unfolded, and includes an inflatable airbag cushion 460, an inflator 51, and a tether 480. Airbag system 450 may be coupled to a structural member 45 of seat assembly 40 using conventional methods. The airbag cushion 460 may form an inflatable portion 461 and may include a plurality of non-inflatable portions 462 adjacent to or surrounded by the inflatable portion 461. For example, the cushion 460 may include two non-inflatable portions 462 in the inflatable portion 461. Thus, the cross-section of cushion 460 may have three regions of the inflatable portion 461, where the first and second inflatable regions are separated by the first non-inflatable portion 462 and the second and third inflatable regions are separated by the second non-inflatable portion 462. The airbag cushion 460 includes a leading edge of deployment 466 configured to unfold or expand away from the trailing edge of deployment 467 when the airbag system 450 is triggered to deploy. During deployment, the inflatable portions 461 may include two opposing curved or concave surfaces 465. The airbag cushion 460 may further include a plurality of openings 469. For example, one opening 469 may be included in each non-inflatable portion 462.

According to an exemplary embodiment, the tether 480 may include a first coupling location 481, a second coupling location 482, a first portion 484, and a second portion 485. The first coupling location 481 may couple to the first coupling location 463 of the cushion 460, which may be on the inboard side of the cushion. The second coupling location 482 may couple to the second coupling location 464 of the cushion 460, which may be on the inboard side of the cushion. The first and second portions 484, 485 of the tether 480 may pass through the openings 469 in cushion 460, so the length of tether 480 between the second coupling location 482 and the second portion 485 may be on the inboard side of the cushion 460, the length of tether 480 between the first coupling location 481 and the first portion 484 may be on the inboard side of the cushion 460, and the length of tether 480 between the first and second portions 484, 485 may be on the outboard side of the cushion 460.

The airbag system 450, as well as any other airbag system described herein, may include a member, such as member 153, 253, for coupling the cushion to the structural member of the seat assembly, such as is described herein. The member 153, 253 may also couple to the inflator 51 for any other embodiment described herein. Further, it should be noted that the second coupling locations as illustrated in FIGS. 5A-5D may also be incorporated into the embodiment shown in FIG. 7 (as well as any other embodiment herein, such as those shown in FIGS. 9 and 10), which make use of the member. It should also be noted that the embodiments described in the present application should not be considered as limitations to the method of coupling the tether to the airbag system or to the seat assembly and any suitable method may be utilized.

Figure 8:
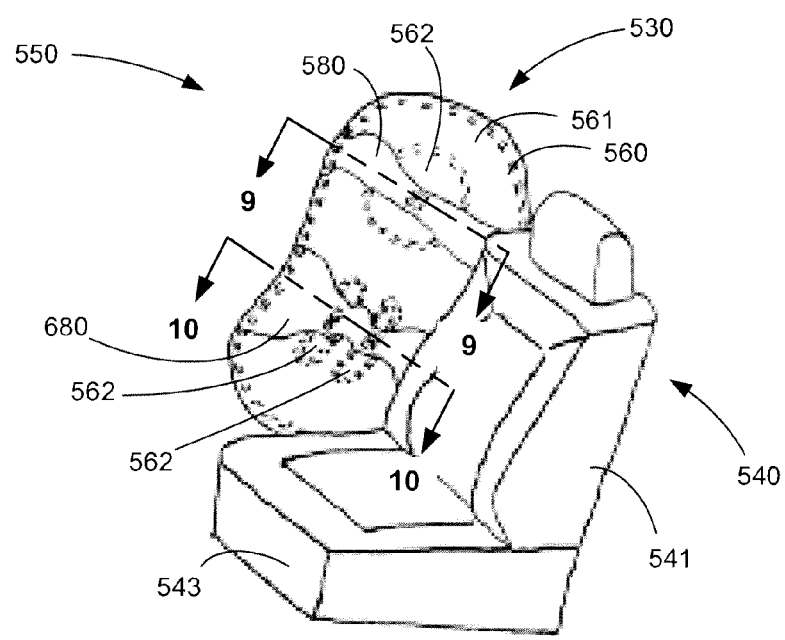
FIG. 8 is a perspective view of another exemplary embodiment of an occupant restraint system illustrated deployed or unfolded from the side of a seat assembly.

With reference to FIG. 8, another passenger compartment 530 is illustrated and includes a seat assembly 540. According to an exemplary embodiment, seat assembly 540 includes a seat-back 541, a seat-cushion 543 and an airbag system 550. The airbag system 550 may be stored in and deployed from anywhere on the seat assembly 540, or from any other vehicle component. Airbag system 550 is shown deployed and includes an airbag cushion 560, a first tether 580 and a second tether 680. The airbag system may include one tether or a plurality of tethers. The airbag cushion 560 includes at least one inflated portion 561 and may include one or a plurality of non-inflated portions 562. The airbag system 550 may further include an inflator 51 to provide inflation gas. The airbag system 550 may couple to the seat assembly, such as a structural member 45.

Figure 9:
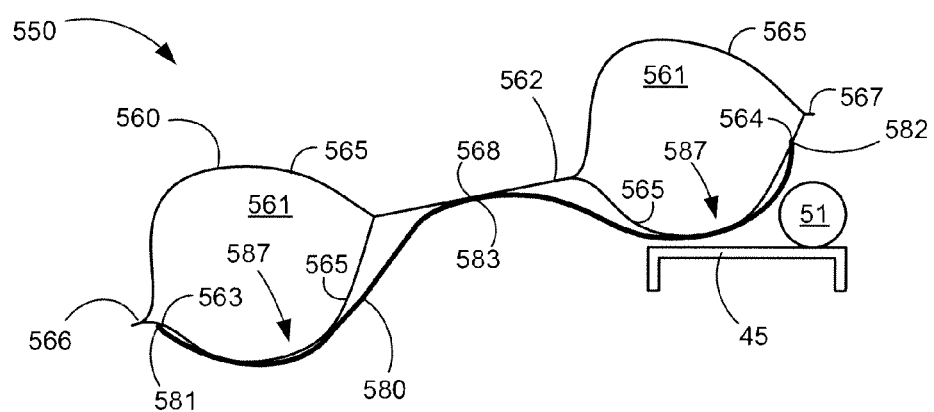
FIG. 9 is a cross-sectional top view, taken along line 9-9 in FIG. 8, illustrating another exemplary embodiment of an occupant restraint system.

With reference to FIG. 9, an exemplary embodiment of an airbag system 550 is shown deployed or unfolded. The cross-section of cushion 560 may be configured to have two regions of the inflatable portion 561 separated by the non-inflatable portion 562. The airbag cushion 560 may include a leading edge of deployment 566 configured to unfold or expand away from a fixed or trailing edge of deployment 567 of cushion 560 when the airbag system 550 is triggered to deploy. During deployment, the inflatable portions 561 may include two opposing curved or concave surfaces 565. According to an exemplary embodiment, the tether 580 may include a first coupling location 581, a second coupling location 582, and a third coupling location 583. The tether may include any number of coupling locations. The first coupling location 581 may couple to the first coupling location 563 of the cushion 560, which may be on the inboard side of the cushion. The second coupling location 582 may couple to the second coupling location 564 of the cushion 560, which may be on the inboard side of the cushion. The third coupling location 583 may couple to a third coupling location 568 of the cushion 560, which may be on the inboard side of the cushion and may be in the non-inflated portion 562.

Figure 10:
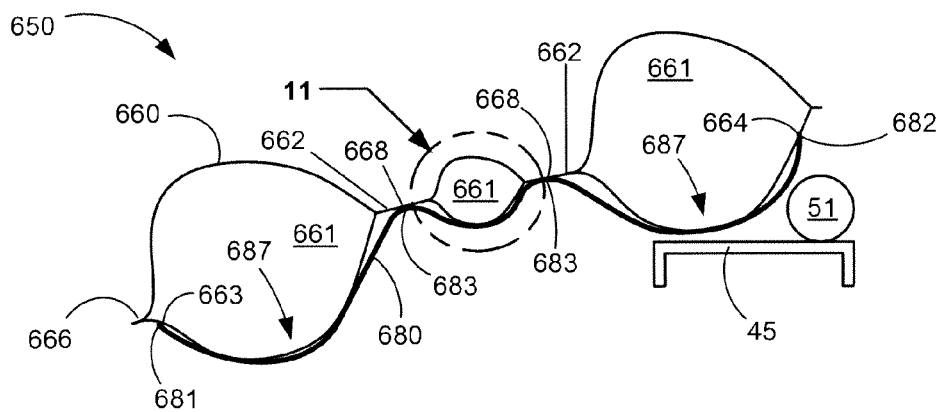
FIG. 10 is a cross-sectional top view, taken along line 10-10 in FIG. 8, illustrating another exemplary embodiment of an occupant restraint system.
Figure 11:
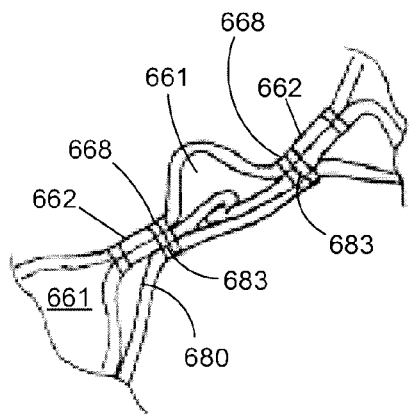
FIG. 11 is a detail view of the occupant restraint system of FIG. 10.

With reference to FIGS. 10 and 11, another exemplary embodiment of an airbag system 650 is shown deployed or unfolded, and includes an inflatable airbag cushion 660, an inflator 51, and a tether 680. Airbag system 650 may be coupled to a structural member 45 of seat assembly 40 using conventional methods. The airbag cushion 660 may include an inflatable portion 661 and may include a plurality of non-inflatable portions 662 in the inflatable portion 661. Thus, the cross-section of cushion 660 may have three regions of the inflatable portion 661, where the first and second inflatable regions are separated by the first non-inflatable portion 662 and the second and third inflatable regions are separated by the second non-inflatable portion 662. The airbag cushion 660 includes a leading edge of deployment 666 configured to unfold or expand away from the trailing edge of deployment or a fixed portion of the cushion 660 when the airbag system 650 is triggered to deploy.

According to an exemplary embodiment, the tether 680 may include a first coupling location 681, and a second coupling location 682. The first coupling location 681 may couple to the first coupling location 663 of the cushion 660, which may be on the inboard side of the cushion 660. The second coupling location 682 may couple to the second coupling location 664 of the cushion 660, which may be on the inboard side of the cushion 660. The tether 680 may include a plurality of coupling locations 683 located between the first and second coupling locations 681, 682. The plurality of coupling locations 683 of the tether 680 may couple to the cushion 660 at a plurality of coupling locations 668, which may be on the inboard side of the cushion 660. The plurality of coupling locations 683 may be configured to be structural.

It should be noted that the embodiments illustrated in FIGS. 7, 8, 9 and 10 may incorporate the coupling methods disclosed in FIGS. 4, 5A and 5B for the second coupling location for the tether. For example, the cushions shown in FIGS. 7, 8, 9 and 10 may include a fastening mechanism or a member for coupling the second coupling location of the tether. Additionally, any of the tethers disclosed herein may be configured to include a strengthening mechanism. According to an exemplary embodiment, the strengthening mechanism may include a folded portion and a stitch. The folded portion may be formed by folding a length of the tether over onto another portion (e.g., the adjacent portion) the tether, then coupling the portions of tether together using a stitch, which may be structural. According to other exemplary embodiments, the strengthening mechanism may be formed by coupling another member to the tether by any suitable method (e.g., stitching, adhesive, fastener). The strengthening mechanism may be used to increase the strength of a portion of tether, which may be subjected to high stress or may include a stress riser (or concentrator), such as an aperture. For example, the end of the tether may be coupled to the seat assembly using a fastener, where the tether includes an aperture to receive the fastener. The portion of the tether having the aperture may include a strengthening mechanism to compensate for the increased stress from having the aperture, when the tether is subjected to tension loading.

During deployment, the inflatable portion of cushion inflates forming a plurality of curved or concave surfaces. The tether may conform to the expanding curved shape of the cushion, forming a concave portion at one or both ends. The tether may be configured to have a distance along the tether between the first coupling location and the second coupling location that is less than the distance along the cushion between the first coupling location and either the second coupling location of the cushion or to the portion of cushion that is adjacent to the second coupling location of the tether. This configuration permits the tether to provide tension to airbag cushion during deployment, tailoring the deployment trajectory of the cushion to, for example, move in a direction towards the occupant during deployment to reduce the displacement of the occupant prior to contact between the cushion and the occupant. Additionally, the tether may be made from a high strength material, such as airbag cushion fabric material, to be structural in order to withstand the relative high tension the tether is subjected to following contact between the cushion and the occupant. Thus, the tether is able to reduce the displacement of the airbag cushion by withstanding the force imparted from the occupant, thereby improving restraint of the occupant by reducing the displacement (or excursion) of the occupant.

During deployment, the leading edge of deployment of the airbag cushion may unfold and expand away from the trailing edge of deployment of the cushion, subjecting the tether to a tension, which alters the trajectory of the deploying cushion. The time, during deployment, at which the tether comes into tension can be varied to change the amount (or distance) the trajectory of the cushion can be modified or to provide improved restraint to the occupant earlier or later in the deployment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An occupant restraint apparatus for a motor vehicle, the restraint apparatus comprising:
a cushion configured to inflate and deploy in a primary deployment direction away from a storage location to provide restraint to an occupant of the vehicle; wherein the cushion includes an inflatable portion and at least one non-inflatable portion;
an inflator configured to provide gas for inflating the inflatable portion of the cushion; and
a tether having a first end connected to the cushion and a second anchored end;
wherein a portion of the tether located between the first end and the second anchored end is engaged with the cushion at the at least one non-inflatable portion; and
wherein when the cushion is deployed the tether extends from the second anchored end to the first end in the primary deployment direction of the cushion wherein the cushion is configured to deploy from a seat assembly within the vehicle.

2. The restraint apparatus of claim 1, wherein the second anchored end of the tether is anchored to the cushion.

3. The restraint apparatus of claim 2, wherein the second anchored end of the tether is anchored to the cushion at a location proximate to an edge of the cushion that trails the rest of the cushion out of a storage location during deployment of the cushion.

4. The restraint apparatus of claim 1, wherein the restraint apparatus further includes one member selected from the group consisting of a flap and a sleeve to anchor the second anchored end of the tether.

5. The restraint apparatus of claim 1, wherein the second anchored end of the tether is anchored to the seat assembly.

6. The restraint apparatus of claim 1, wherein the tether is shorter than the distance between locations on the cushion adjacent to the first end and the second anchored end of the tether to tailor the deployment trajectory of the cushion and to provide occupant restraint.

7. The restraint apparatus of claim 1, wherein the tether is connected to the cushion in at least one additional position located between the first end and the second anchored end of the tether.

8. The restraint apparatus of claim 7, wherein the connection between the tether and the cushion located at the at least one additional position includes a tear stitch.

9. The restraint apparatus of claim 1, wherein the at least one non-inflatable portion includes a first opening, and wherein the tether passes through the first opening.

10. The restraint apparatus of claim 9, wherein the cushion includes a second opening located in one of the at least one non-inflatable portions of the airbag and the tether passes through the second opening so that the portion of the tether between the first and second openings is located on a different side of the cushion than the portion of the tether located between the first opening and the first end of the tether.

11. The restraint apparatus of claim 10, wherein the portion of the tether located between the first and the second openings is in contact with an inflatable portion of the airbag.

12. The restraint apparatus of claim 10, wherein the first and second openings are located in the same non-inflatable portion of the airbag.

13. The restraint apparatus of claim 1, wherein the tether is coupled to the at least one non-inflatable portion.

14. An occupant restraint apparatus for a motor vehicle, the apparatus comprising:
an inflatable cushion having a non-inflatable portion and configured for storage in a folded configuration;
an inflator configured to provide gas to inflate the cushion;
wherein the cushion is configured to inflate out of the folded configuration and deploy in a primary deployment direction into a position to provide restraint to an occupant of the vehicle; and
a tether for controlling the deployed positioning of the cushion that includes a first location at a first end of the tether and a second location at a second end of the tether; wherein the tether is coupled to the cushion at the first location and wherein the tether is engaged with the non-inflatable portion at a third location; and wherein the third location is located on the tether between the first and second locations; and
wherein the distance along the tether from the first location to the second location of the tether is less than the distance along the cushion from the first location to a portion of the cushion adjacent to the second location; and
wherein when the cushion is deployed the tether extends from the second end to the first end in the primary deployment direction of the cushion.

15. The restraint apparatus of claim 14, wherein the cushion is configured to deploy from the side of a seat assembly within the vehicle.

16. The restraint apparatus of claim 14, wherein the first location is positioned proximate to an edge of the cushion that is forward of a fixed position of the cushion.

17. The restraint apparatus of claim 14, wherein the second location of the tether is coupled to the cushion.

18. The restraint apparatus of claim 17, wherein the second location includes at least one member selected from the group consisting of a flap and a sleeve.

19. The restraint apparatus of claim 14, wherein the second location of the tether is coupled to a seat assembly.

20. The restraint apparatus of claim 14, wherein the non-inflatable portion comprises non-inflatable portions; wherein the tether is engaged with the non-inflatable portion at a fourth location; and wherein the fourth location is located on the tether between the second location and the third location.

21. The restraint apparatus of claim 20, wherein the portion of the tether located between the third and the fourth locations is in contact with an inflatable portion of the airbag.

22. The restraint apparatus of claim 20, wherein the third and fourth locations are located in different ones of the non-inflatable portions of the airbag.

23. The restraint apparatus of claim 20, further comprising at least one coupling between the tether and the cushion located in the non-inflatable portion of the cushion at the third location and/or fourth location and wherein said coupling of the tether to the cushion at the third location and/or fourth location is a tear stitch.

24. The restraint apparatus of claim 14, wherein the tether is shorter than the distance between locations on the cushion adjacent to the first and second locations of the tether in order for the tether to withstand loading of the occupant to provide occupant restraint.

25. The restraint apparatus of claim 14, wherein the cushion includes an opening in the non-inflatable portion and the tether passes through the opening at the third location.

26. The restraint apparatus of claim 14, wherein the tether passes through the non-inflatable portion at a fourth location; and wherein the fourth location is located on the tether between the second location and the third location.

* * * * *

UNITED STATES PATENT AND TRADEMARK OFFICE
CERTIFICATE OF CORRECTION

| | |
|---|---|
| PATENT NO. | : 8,360,469 B2 |
| APPLICATION NO. | : 12/870720 |
| DATED | : January 29, 2013 |
| INVENTOR(S) | : Richard Wiik et al. |

It is certified that error appears in the above-identified patent and that said Letters Patent is hereby corrected as shown below:

ON THE TITLE PAGE

Please correct the assignee information as follows:

(73) Assignee: TK Holdings Inc., Auburn Hills, MI (US); GM Global Technology Operations LLC, Detroit, MI (US).

Signed and Sealed this
Twenty-third Day of July, 2013

Teresa Stanek Rea
*Acting Director of the United States Patent and Trademark Office*